United States Patent
Cheng

(10) Patent No.: US 8,207,710 B2
(45) Date of Patent: Jun. 26, 2012

(54) REGULATOR ADAPTED TO VARIOUS VEHICLE ALTERNATORS

(75) Inventor: Hsi-Chin Cheng, Taoyuan Hsien (TW)

(73) Assignee: Actron Technology Corporation, Taoyuan Hsien (TW)

( * ) Notice: Subject to any disclaimer, the term of this patent is extended or adjusted under 35 U.S.C. 154(b) by 535 days.

(21) Appl. No.: 12/525,904

(22) PCT Filed: Feb. 2, 2008

(86) PCT No.: PCT/CN2008/070250
§ 371 (c)(1),
(2), (4) Date: Aug. 5, 2009

(87) PCT Pub. No.: WO2008/101427
PCT Pub. Date: Aug. 28, 2008

(65) Prior Publication Data
US 2010/0097039 A1    Apr. 22, 2010

(30) Foreign Application Priority Data
Feb. 9, 2007   (CN) .......................... 2007 1 0005519

(51) Int. Cl.
*H02J 7/14* (2006.01)
*H02P 9/10* (2006.01)

(52) U.S. Cl. ........................................ 322/28; 322/59
(58) Field of Classification Search .................... 322/25, 322/27, 28, 37, 59, 99
See application file for complete search history.

(56) References Cited

U.S. PATENT DOCUMENTS

| | | | |
|---|---|---|---|
| 4,310,793 A * | 1/1982 | Sheldrake et al. | 322/28 |
| 4,335,344 A * | 6/1982 | Gant | 322/25 |
| 4,634,954 A * | 1/1987 | Kato et al. | 322/28 |
| 4,733,159 A * | 3/1988 | Edwards et al. | 323/282 |
| 4,789,817 A * | 12/1988 | Asakura et al. | 322/28 |
| 4,961,045 A * | 10/1990 | Gray et al. | 323/273 |
| 5,083,038 A * | 1/1992 | Fukushima et al. | 290/40 A |
| 5,173,654 A * | 12/1992 | Boella et al. | 322/25 |
| 5,671,149 A | 9/1997 | Brown | |
| 6,028,416 A * | 2/2000 | Tallarek | 322/59 |
| 6,118,186 A * | 9/2000 | Scott et al. | 290/40 B |
| 2006/0213882 A1 | 9/2006 | Biunno | |

FOREIGN PATENT DOCUMENTS

| | | |
|---|---|---|
| CN | 2092164 | 1/1992 |
| CN | 2281041 Y | 5/1998 |
| CN | 2831611 Y | 10/2006 |
| DE | 3308328 A1 | 9/1984 |

\* cited by examiner

*Primary Examiner* — Nicholas Ponomarenko
(74) *Attorney, Agent, or Firm* — Kile Goekjian Reed & McManus PLLC

(57) ABSTRACT

Provided is a regulator adapted to the various vehicle alternators of the present invention. The regulator particularly includes a coding circuit and a control circuit. The coding circuit is used to provide the different selectable codes. A laser trimming technology is introduced to form an open circuit over the coding circuit, in order to set a code. The control circuit is used to predetermine the various function selections in accordance with the various codes. The coding circuit includes an amplifier, a first input resistor, and a second resistor. The first input resistor is interconnected to a high-voltage end and an input end of the amplifier in series. The second input resistor is further interconnected to the input end and a low-voltage end in series. The open circuit is particularly formed on the first input resistor or the second input resistor for regulating the output voltage and setting a code.

7 Claims, 3 Drawing Sheets

US 8,207,710 B2

REGULATOR ADAPTED TO VARIOUS VEHICLE ALTERNATORS

BACKGROUND OF THE INVENTION

1. Field of the Invention

The present invention relates to a regulator for vehicle, more particularly to the voltage regulator adapted to the various vehicle alternators.

2. Description of Related Art

Reference is made to FIG. 1, which illustrates a schematic block diagram of a typical vehicle alternator. The shown alternator 1 is composed of a rotor winding 12 and a stator winding 11. In which, the stator winding 11 is a three-phase stator winding. When an exciting current flows through the rotor winding 12, and meantime an internal combustion engine (now shown) of the vehicle drives the rotor winding 12, the rotor winding 12 will generate a revolving magnetic field. Thus the field segments the stator winding 11 and then the three-phase alternating current is generated.

A rectifier 2 then receives the output from the alternator 1, and rectifies the three-phase alternating current and outputs a direct current. The output of the direct current is used to charge a battery set 4. The rectifier 2 has an output end 21 and a ground end 22. The output end 21 connects to a high-voltage end 41 of the battery set 4 in order to process charging.

Furthermore, a power transistor 32 is electrically connected to the rotor winding 12, and used for switching on or off the exciting current flowing to the rotor winding 12. Further, a regulating circuit 31 is electrically connected to the stator winding 11 of the alternator 1. The regulator circuit 31 is used to detect the output voltage of the alternator 1 for switching on or off the power transistor 32. Therefore, the output voltage of the alternator 1 can be regulated, and prevent the battery set 4 from overcharging damage.

Generally, the regulating circuit 31 is a proprietary design for a specific alternator. Thus the various alternators need to set various configurations on the corresponding regulating circuits. Therefore the manufacturers usually have to develop the proprietary regulating circuits directed to the various alternators, and those regulating circuits can not apply to each other. Those drawbacks may cause the higher development and storage cost.

For solving the above-described problems, the prior art ever announced a regulating circuit which works with software control in order to provide a single regulating circuit adapted to the various alternators. However, this regulating circuit needs the extra storage, such as EEPROM, to store the relevant software program. More, the means by software control may cause unstable situation to the circuitry.

SUMMARY OF THE INVENTION

In view of the mentioned drawbacks of the prior arts, the present invention provides a voltage regulator which is adapted to the various alternators, especially for the vehicles. Furthermore, the claimed voltage regulator can prevent the unstable situation caused by the software control.

In the preferred embodiment of the present invention, the claimed voltage regulator adapted to the various alternators is particularly implemented by hardware.

The claimed voltage regulator includes a coding circuit, a digital control unit, and a control circuit. In which, a laser trimming technology is introduced to form an open circuit (a break) over the coding circuit, in order to configure the various codes. The digital control unit is connected to the coding circuit, and used for identifying the code configured on the coding circuit. The control circuit is used to provide the different configurations in accordance with the various codes, and then to configure an operating mode according to the code configured by the coding circuit. The control circuit can be manufactured on an application-specific integrated circuit (ASIC). The coding circuit generally includes an amplifier, a first resistor, and a second resistor. The first resistor is connected to an intermediate position between a high-voltage end and an input end of the amplifier in series. The second resistor is similarly connected to another intermediate position between the input end and a low-voltage end in series. The laser trimming technology is used to form an open circuit on the first resistor or the second resistor, in order to regulate the output voltage of the amplifier and select a code.

In one of the embodiments of the present invention, the coding circuit has four amplifiers, four first wires, and four second wires. The embodiment provides sixteen coding selections.

In another embodiment of the present invention, the coding circuit has four amplifiers, four first resistors, and four second resistors. This embodiment also provides sixteen selections.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
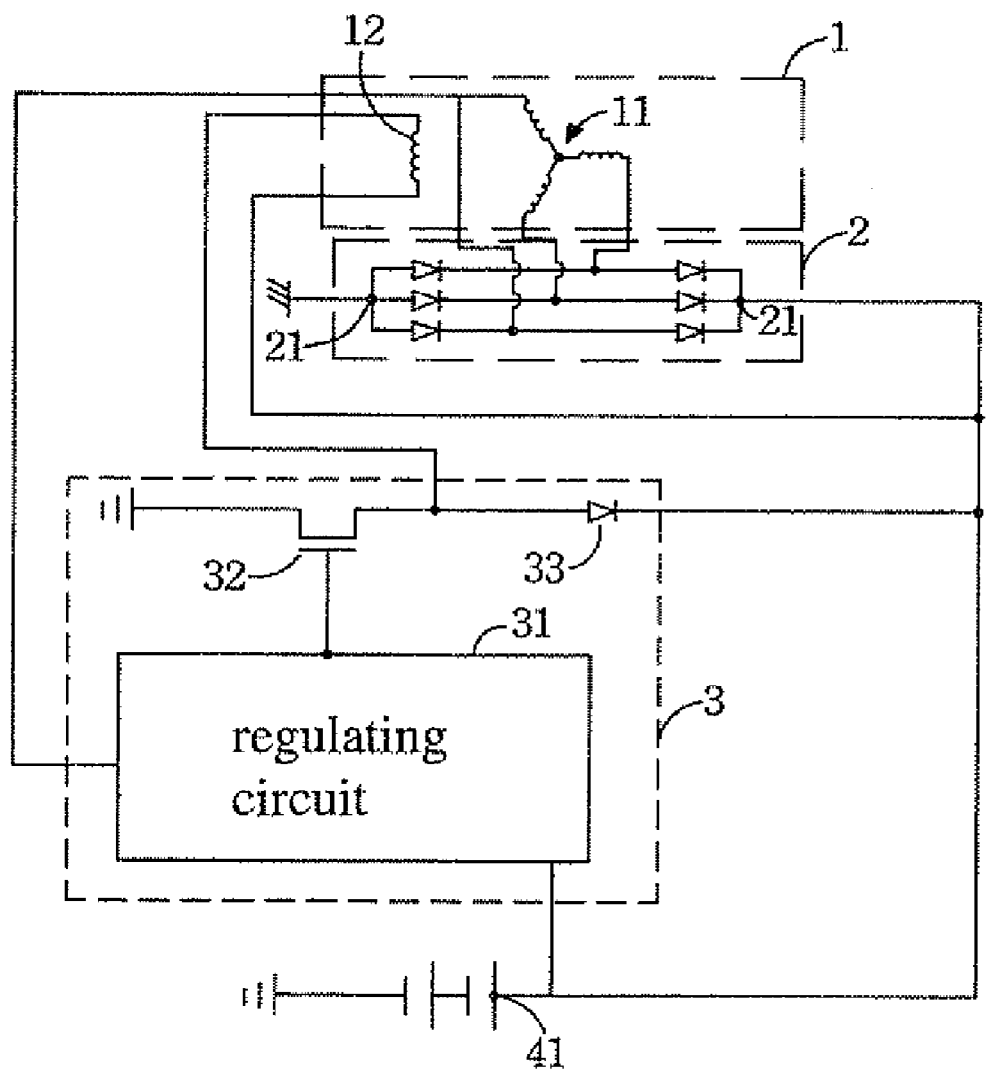
FIG. 1 shows a circuit diagram of a typical regulator used for a conventional vehicle alternator.
Figure 2:
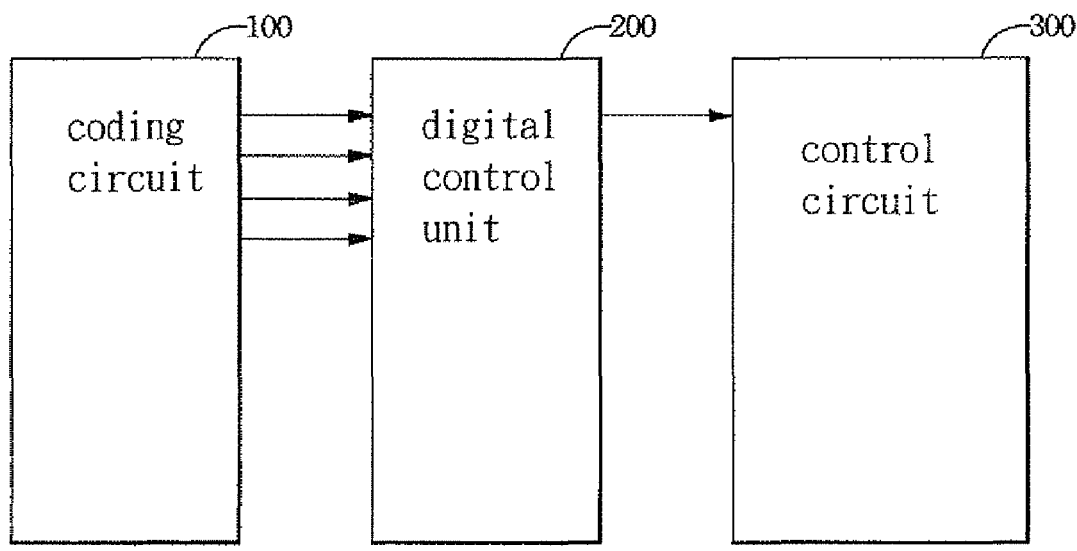
FIG. 2 is a schematic diagram of the preferred embodiment of the vehicle alternator of the present invention.

Reference is made to FIG. 2 illustrating a schematic diagram of the preferred embodiment of the voltage regulator for various vehicle alternators of the present invention. The regulator 3 adapted to the vehicle alternator includes a coding circuit 100, a digital control unit 200, and a control circuit 300. The coding circuit 100 is used to provide the various selectable codes. The digital control unit 200 is electrically connected to the coding circuit 100, and used to identify the code represented by the coding circuit 100. Furthermore, the digital control unit 200 can output the various simulation signals (such as the different voltages) to the control circuit 300 according to the various codes (such as digital signals). Based on the output signals, an operating mode with corresponding alternator is provided. The control circuit 300 provides the various configurations in accordance with the codes. Particularly, the control circuit 300 can be manufactured on an application-specific integrated circuit.

Figure 3:
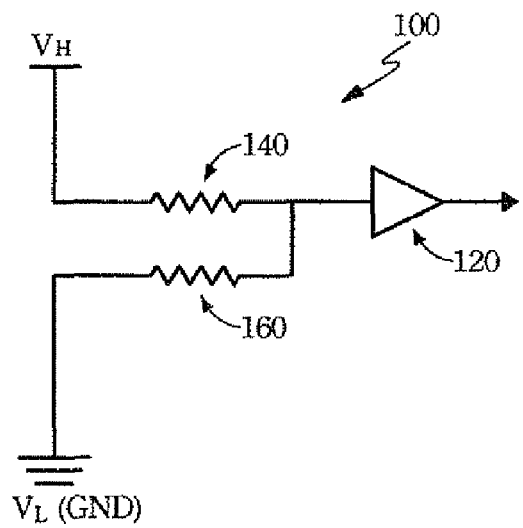
FIG. 3 shows a circuit diagram of the preferred embodiment of the coding circuit of the present invention.

Further referring to FIG. 3, which is a circuit diagram of a preferred embodiment of the coding circuit 100 of the present invention. The shown coding circuit 100 generally includes an amplifier 120, a first resistor 140, and a second resistor 160. The first resistor 140 is in series connected to a first intermediate position between a high-voltage end $V_H$ and an input end A of the amplifier 120. The second resistor 160 is further connected to a second intermediate position between the input end A and a low-voltage end $V_L$.

Furthermore, in another preferred embodiment of the present invention, the low-voltage end $V_L$ can be a ground (GND). The value of the first resistor 140 is ranged from 5 k ohm to 10 k ohm. The value of the second resistor 160 is also ranged from 5 k ohm to 10 k ohm. The voltage of the high-voltage end $V_H$ is ranged between 4.5 volt and 5.5 volt. The condition of whether or not the laser trimming technology (utilizing a laser device) is used to form an open circuit (a break) over the first resistor 140 or the second resistor 160 is used to set a code.

Referring to an exemplary example, when an open circuit is formed over the first resistor 140, the amplifier 120 output a high-voltage signal to the digital control unit 200. In this condition, the code is set to 1. Alternatively, when the open circuit is formed over the second resistor 160, the amplifier 120 outputs a low-voltage signal to the digital control unit 200. The code, on the contrary, is set to 0 in this condition. In the current example, one amplifier 120, one first resistor 140, and one second resistor 160 are provided, so that there are two selectable codes, i.e., 1 and 0. Furthermore, if two amplifiers 120, two first resistors 140, and two second resistors 160 are analogously provided, it's to render four selectable codes, i.e., 00, 10, 01, and 11.

Figure 4:
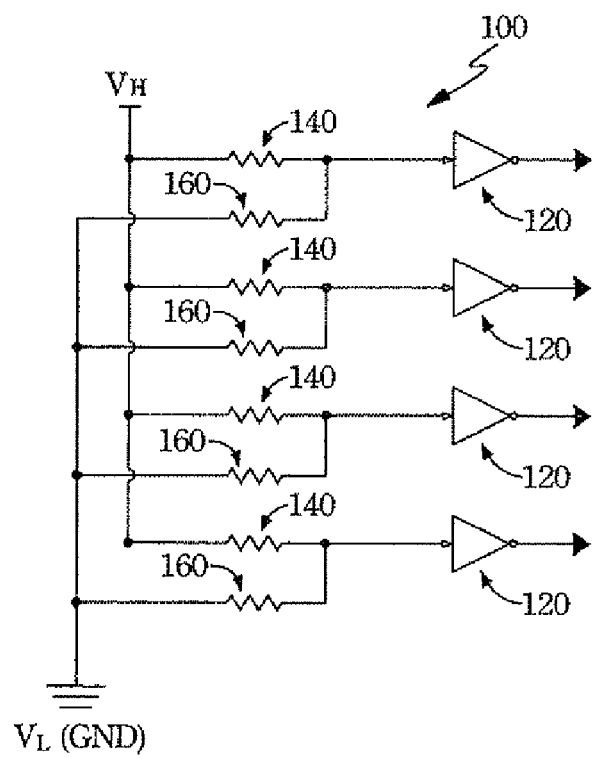
FIG. 4 shows a circuit diagram of the other preferred embodiment of the coding circuit of the present invention.

Reference is made to FIG. 4, which illustrates a circuit diagram of the coding circuit 100' according to one preferred embodiment of the present invention. The coding circuit 100' preferably includes four amplifiers 120, four first resistors 140, and four second resistors 160. In which, the four first resistors 140 are individually connected to the intermediate positions among the high-voltage end $V_H$ and the corresponding output ends A of the amplifiers 120 in series. Similarly, the four second resistors 160 are also individually connected to the intermediate position among the corresponding input ends A of the amplifiers 120 and the low-voltage end $V_L$. Such as the reference made to FIG. 4A, there are four sets of the first resistor 140 and the second resistor 160 arranged in the circuitry. Totally, the circuit provides sixteen selectable codes, i.e., 0000, 0001, 0010, 0100, 1000, 0011, 0101, 1001, 0110, 1010, 1100, 0111, 1011, 1101, 1110, and 1111.

Figure 5:
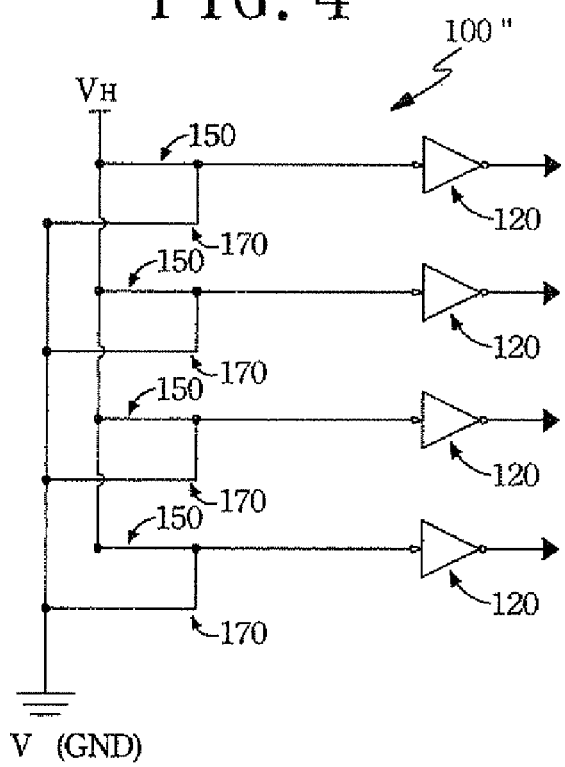
FIG. 5 shows a circuit diagram of the further preferred embodiment of the coding circuit of the present invention.

Further reference is made to FIG. 5 showing a circuit diagram of the coding circuit 100" according to one more preferred embodiment. It's noted that the resistors 140, 160 connected with the coding circuit 100' of FIG. 4 are utilized to be the input impedances. In comparison with FIG. 4, no any additional resistor is needed to connect to the amplifier according to the embodiment shown in FIG. 5. Preferably, a first wire 150 and a second wire 170 exemplarily shown in FIG. 5 are directly connected with the high-voltage end, the input end A of the amplifier 120, and the low-voltage end $V_L$. More particularly, the coding circuit utilizes a laser device to trim the first wire or the second wire to form an open circuit, so as to set a code of the coding circuit. More, the condition of whether or not an open circuit is formed over the first wire 150 or the second wire 170 by the laser trimming technology is used to set the code.

To sum up the above description, the hardware-implemented regulator (3) of the present invention incorporating the coding circuit (100) can fit with the various requests made by users, rather than the conventional regulator merely adapted to a proprietary alternator. The claimed voltage regulator adapted to the various vehicle alternators particularly provides more flexible applications. Still further, since the coding circuit (100) conducting the code for configuring the regulator (3) is made by hardware arrangement, the unstable problem caused by the conventional software implementation can be prevented.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What we claim is:

1. A voltage regulator adapted to the various alternators for a vehicle, comprising:
   a coding circuit at least having an amplifier, a first wire, and a second wire, wherein the amplifier disposes an input end, the first wire is interconnected to the input end and a high-voltage end, and the second wire is interconnected to the input end and a low-voltage end, the coding circuit may utilize a laser device to trim the first wire or the second wire to form an open circuit, so as to set a code of the coding circuit;
   a digital control unit electrically connected to the coding circuit for identifying the code of the coding circuit to form an output signal according to the code of the coding circuit; and
   a control circuit providing various configuration corresponding to the various codes, and an operating mode is provided to the alternator after receiving the output signal of the digital control unit.

2. The voltage regulator of claim 1, further comprising a first resistor connected to the first wire in series.

3. The voltage regulator of claim 1, further comprising a second resistor connected to the second wire in series.

4. The voltage regulator of claim 1, wherein the coding circuit comprising:
   four amplifiers;
   four first wires individually interconnected to a high-voltage end and four corresponding input ends of four amplifiers in series; and
   four second wires individually interconnected to the corresponding input ends of four amplifiers and a low-voltage end in series.

5. The voltage regulator of claim 4, further comprising four first resistors individually connected to the corresponding first wires in series.

6. The voltage regulator of claim 4, further comprising four second resistors individually connected to the corresponding second wires in series.

7. The voltage regulator of claim 1, wherein the output voltage of the amplifier is a high voltage, the code of the coding circuit is 1; the output voltage is a low voltage, the code of the coding circuit is 0.

* * * * *